ns patent

United States Patent [19]
Seki et al.

[11] Patent Number: 4,904,914
[45] Date of Patent: Feb. 27, 1990

[54] NC DATA CREATION METHOD

[75] Inventors: Masaki Seki; Takashi Takegahara, both of Tokyo; Takeshi Arakaki, Yamanashi, all of Japan

[73] Assignee: Fanuc Ltd, Minamitsuru, Japan

[21] Appl. No.: 314,059

[22] PCT Filed: Jul. 1, 1988

[86] PCT No.: PCT/JP88/00664

§ 371 Date: Feb. 9, 1989

§ 102(e) Date: Feb. 9, 1989

[87] PCT Pub. No.: WO89/00304

PCT Pub. Date: Jan. 12, 1989

[30] Foreign Application Priority Data

Jul. 2, 1987 [JP] Japan .................. 62-166155

[51] Int. Cl.$^4$ ............................................. H04N 7/18
[52] U.S. Cl. .................. 318/567; 318/568.1; 318/569; 318/577; 340/709; 340/710; 364/474.25
[58] Field of Search .............. 318/562–577, 318/594–598, 628–634; 364/474.22, 474.34, 474.35, 474.37, 474.26, 190, 192; 360/709, 710, 716, 706, 721, 747

[56] References Cited

U.S. PATENT DOCUMENTS

| | | | |
|---|---|---|---|
| 4,295,198 | 10/1981 | Copeland et al. | 318/568.1 X |
| 4,514,818 | 4/1985 | Walker | 340/710 X |
| 4,644,460 | 2/1987 | Kishi et al. | 318/568.1 X |
| 4,663,416 | 5/1987 | Walker | 340/710 X |
| 4,663,705 | 5/1987 | Kishi et al. | 340/706 X |
| 4,727,496 | 2/1988 | Ryouki | 364/474.25 X |
| 4,728,945 | 3/1988 | Kojima | 340/709 X |
| 4,763,119 | 8/1988 | Matsubara et al. | 340/709 X |
| 4,782,335 | 11/1988 | Gussin | 340/709 |
| 4,789,855 | 12/1988 | Ozeki | 340/709 X |

Primary Examiner—William M. Shoop, Jr.
Assistant Examiner—Paul Ip
Attorney, Agent, or Firm—Staas & Halsey

[57] ABSTRACT

The invention relates to a method of creating NC data for machining the interior of an area. The method includes displaying, on a graphic display unit (106), contours (CNT1, CNT2) inputted in order to specify the area ($AR_M$), recognizing the area ($AR_M$), which is designated by a graphic cursor by manipulation of a tablet (108) and painting the interior of the area in a predetermined color, subsequently removing the paint in a linear area ($AR_1$), having a width equivalent to a width of a tool, which connects a machining starting point ($P_S$) and a machining end point ($P_E$) designated by the graphic cursor, adopting the machining end point as the next machining starting point, thereafter inputting machining end points in succession, and creating NC data for machining the interior of the area ($AR_M$) by traversing a finally designated machining starting point and machining end point while moving the tool linearly.

2 Claims, 4 Drawing Sheets

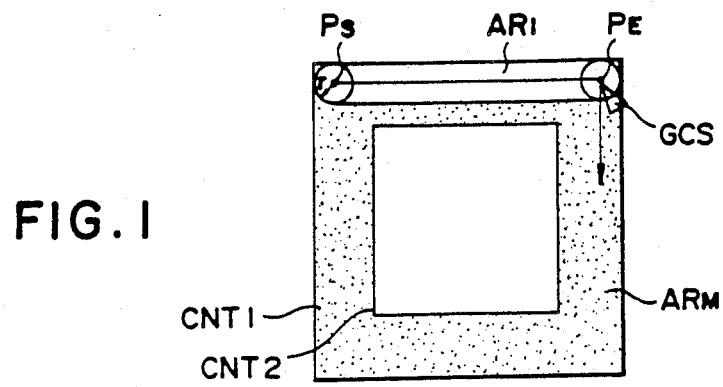
FIG. 1
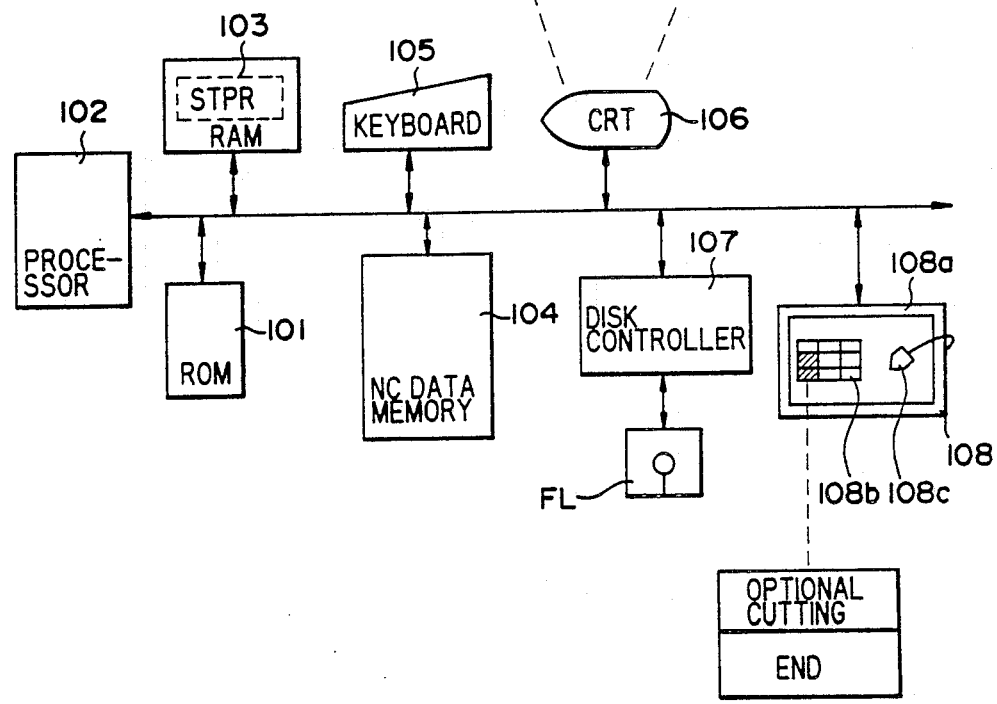

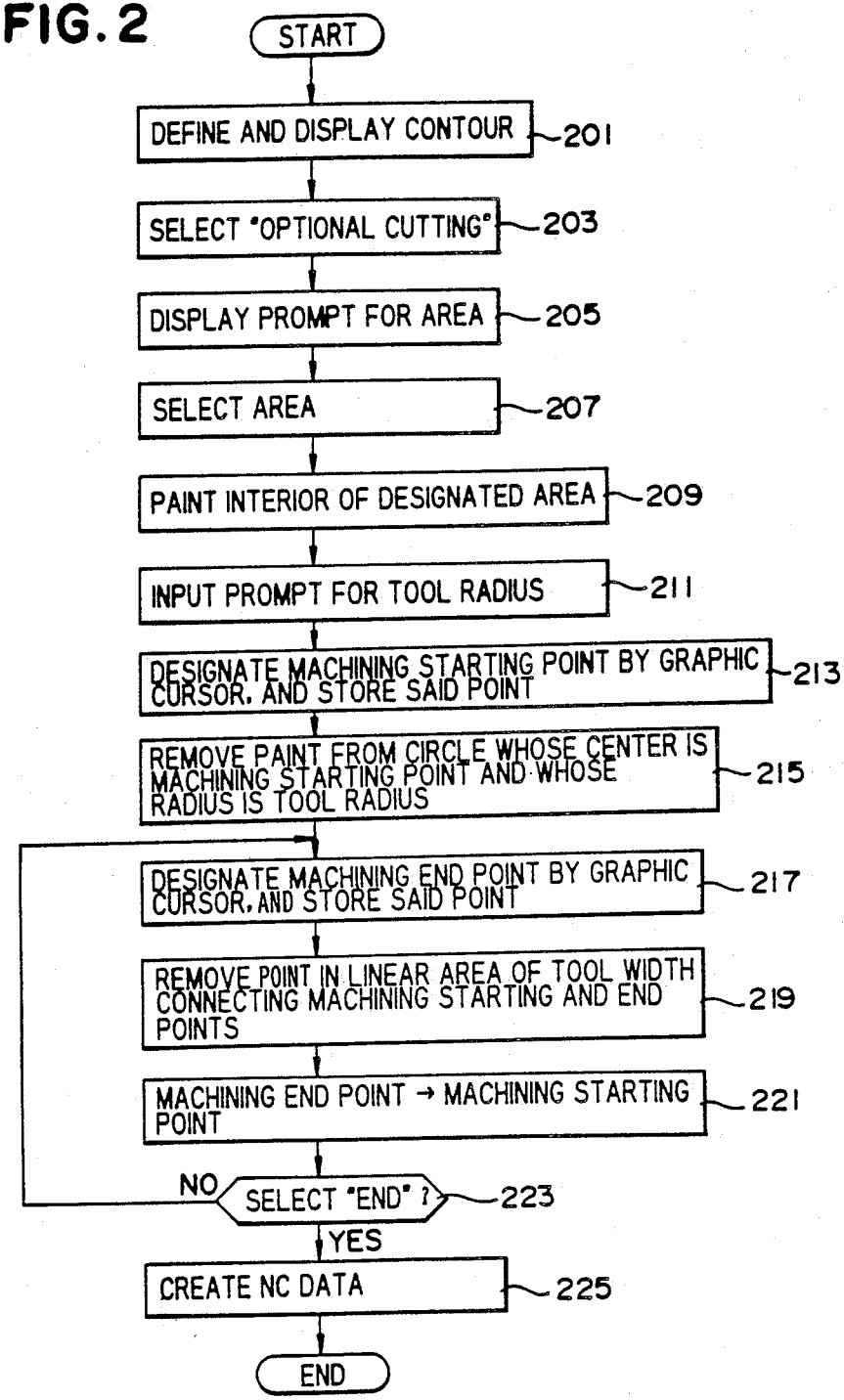

WK
WORKPIECE

PT
PART

NC DATA CREATION METHOD

DESCRIPTION

1. Technical Field

This invention relates to a method of creating NC data, and more particularly, to an NC data creation method in which the path of a tool for machining the interior of an area can be inputted while being perceived visually.

2. Background Art

In the prior art, if a machining method (one-way cutting, two-way cutting, spiral cutting, etc.), cutting direction, cut-in direction, finishing allowance, remaining thickness, spindle speed, cutting velocity, tool diameter and the like are inputted in accordance with the same conversational display, a tool path may be decided and created based on an already defined contour irrespective of whether NC data for subjecting the interior of the contour to surface machining or pocket machining is for the purpose of rough machining or finishing machining.

This conventional method is advantageous in that NC data for highly precise cutting is obtained. When a contour is a complicated one, however, considerable time is required to create the NC data and the tool path includes needless path segments (paths which do not contribute to cutting). Cutting efficiency suffers as a result.

In the case of rough machining, the NC data for cutting need not have as high a precision as that for finishing machining. Accordingly, there is a demand for a method through which data required for the creation of NC data for rough machining may be simply defined in a manner different from that of the conventional method so as to raise machining efficiency.

An object of the invention is to provide an NC data creation method through which NC data for rough machining of an area can be simply created for excellent cutting efficiency.

Another object of the invention is to provide an NC data creation method through which it is possible to recognize at a glance whether portions remain to be cut or will be cut too much.

DISCLOSURE OF THE INVENTION

An NC data creation method for machining the interior of an area includes displaying, on a graphic display unit, contours inputted in order to specify the area, recognizing the area, which is designated by a graphic cursor by manipulation of a tablet and painting the interior of the area in a predetermined color, subsequently removing the paint in a linear area, which has a width equivalent to a width of a tool, connecting a machining starting point and a machining end point designated by the graphic cursor, adopting the machining end point as the next machining starting point, thereafter inputting machining end points in succession, and creating NC data for machining the interior of the area by traversing a finally designated machining starting point and machining end point while moving the tool linearly.

BRIEF DESCRIPTION OF THE DRAWINGS

FIG. 1 is a block diagram of an automatic programming system to which the method of the invention can be applied;

FIG. 2 is a flowchart of processing according to the invention;

BEST MODE FOR CARRYING OUT THE INVENTION

FIG. 1 is a block diagram of an automatic programming system to which the method of the invention can be applied.

Numeral 101 denotes a ROM storing a loading program and the like, 102 a processor which performs automatic programming processing, and 103 a RAM. The RAM 103 stores a system program STPR for NC data creation read in from a floppy FL, the results of processing, etc.

Numeral 104 denotes an NC data memory for storing created NC data, 105 a keyboard, 106 a graphic display unit (CRT), 107 a disk controller, and 108 a tablet device having a tablet surface 108a to which a menu table 108b is affixed. The tablet is so adapted that a prescribed menu item can be selected by a tablet cursor 108c. Further, the arrangement is such that a graphic cursor GCS on the display screen is moved by moving the tablet cursor 108c on the tablet surface. The menu table 108b is provided with various menu items, among which the items "OPTIONAL CUTTING" and "END" have a bearing upon the present invention.

Figure 3A:
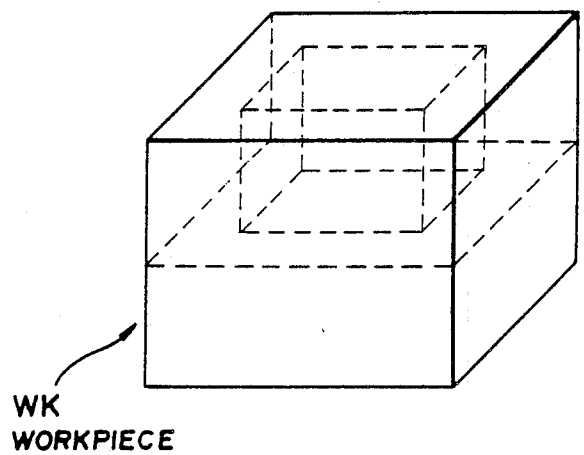
FIG. 3 is a view showing the shape of a workpiece and the shape of a part.
Figure 3B:
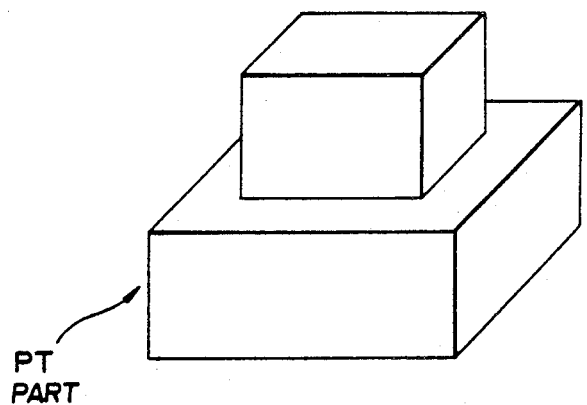

FIG. 2 is a flowchart of processing according to the present invention, FIG. 3 is a view showing the shapes of a workpiece and part, and FIG. 4 is a view for describing processing according to the invention. The processing of the invention will now be described with regard to creation of NC data for machining a workpiece WK shown in FIG. 3(a) into a part PT shown in FIG. 3(b).

Figure 4A:
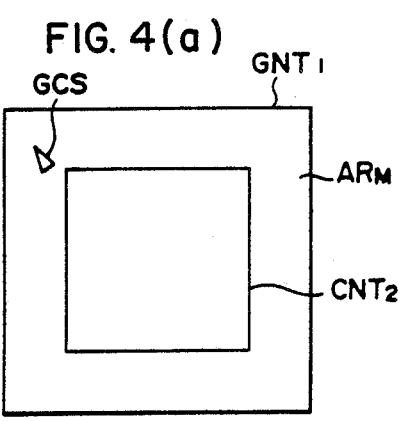
FIG. 4 is a view for describing processing according to the invention.

First, contours CNT1, CNT2 necessary to specify a cutting area $AR_M$ [FIG. 4(a)] are inputted using the keyboard 105 or tablet 108, whereby these contours are displayed on the display screen of the graphic display unit 106 (step 201).

Next, when the menu item "OPTIONAL CUTTING" on the menu table 108b is selected (step 203), a prompt such as "ENTER AREA", which calls for the input of an area, is displayed on the display screen (step 205).

Figure 4D:
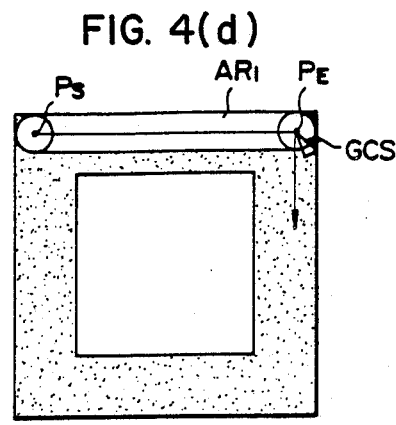
Figure 4B:
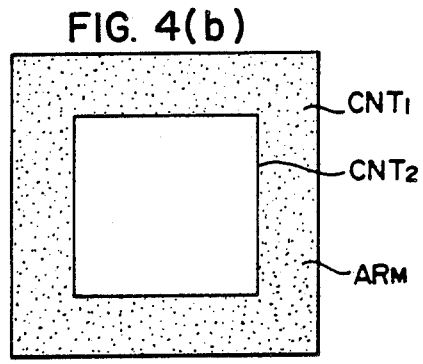

When the desired area $AR_M$ is designated (step 207) by the graphic cursor GCS through use of the tablet cursor 108c in response to the prompt regarding the area, the graphic display unit 106 recognizes the designated area and paints the interior of this area in a predetermined color [see FIG. 4(b), step 209].

Next, a prompt regarding tool radius appears on the display screen, in response to which a tool radius r is inputted (step 211).

Figure 4E:
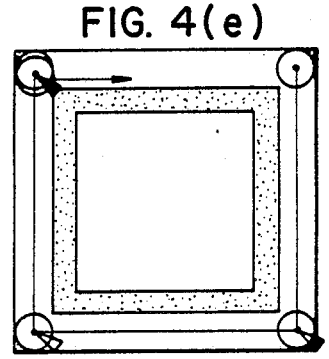
Figure 4C:
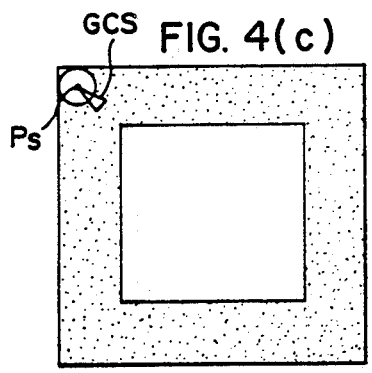
Figure 4F:
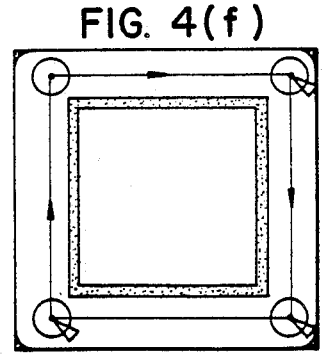

This is followed by selecting a machining starting point $P_s$ [FIG. 4(c)] by the graphic cursor GCS, whereupon the processor 102 stores the coordinates of this machining starting point $P_S$ in the RAM 103 (step 213) and removes the paint in a circle whose center is the machining starting point $P_s$ and whose radius is the designated tool radius r (step 215). As a result, the operator is capable of perceiving when an area from which paint has been removed is an area cut.

Thereafter, when the machining end point $P_E$ is selected by the graphic cursor GCS [FIG. 4(d)], the processor 102 stores the coordinates of the machining end point $P_E$ in the RAM 103 (step 217) and causes the display unit 106 to remove the paint from a linear area $AR_1$, the width whereof is the width of the tool, connecting the machining end point $P_E$ and the machining starting point $P_S$ (step 219). As a result, the operator recognizes it when the area from which the paint is removed is cut.

Next, the processor 102 adopts the machining end point $P_E$ as the next machining end point $P_E$ (step 221).

Thereafter, the operations and processing from step 217 onward are repeated to successively input machining end points [see FIGS. 4(e), (f)] until the last machining end point is entered. When this has been accomplished, the operator selects the menu item "END" on the menu table 108b [step 223).

When the menu item "END" has been selected, the processor 102 creates NC data for machining the interior of the area by successively traversing the machining starting and end points, which have been stored in the RAM 103, while the tool is made to move linearly, stores these data in the NC data memory 104 and then ends the processing for creating NC data for the rough machining of an area.

In a case where excessive cutting would take place by exceeding the boundaries of the designated area $AR_M$, the excessively cut portion is rendered distinguishable, as by painting it in a different color. With such an arrangement, excessive cutting becomes obvious at once so that a correction can be made with facility.

Thus, in accordance with the invention, it is arranged to display, in painted form, the interior of an area to be machined, successively input machining starting and end points and remove the paint in an area cut away by tool movement along straight lines connecting starting points and end points. As a result, it is possible to recognize at a glance whether portions remain to be cut or will be cut too much, and NC data for rough machining of an area can be simply created for excellent cutting efficiency.

We claim:

1. A method of creating NC data for machining any area, characterized by:
    displaying, on a graphic display screen, contours inputted in order to specify the area;
    recognizing the area, which is designated by a graphic cursor by manipulation of a tablet, and painting the interior of the area in a predetermined color;
    removing the paint in a circle having as its center a machining starting point designated by the graphic cursor and as its radius a designated tool radius;
    then removing paint in a linear area, having a diameter equivalent to a tool width, which connects a machining end point designated by the graphic cursor and said machining starting point, and adopting said machining end point as the next machining starting point; and
    thereafter inputting machining end points in succession, and creating NC data for machining the interior of the area by traversing a finally designated machining starting point and machining end point while moving a tool linearly.

2. A method of creating NC data according to claim 1, characterized by displaying an excessively cut portion in a distinguishable manner if cutting is designated that exceeds boundaries of said area.

* * * * *